Nov. 13, 1956   J. R. OISHEI ET AL   2,770,017
WINDSHIELD WASHER SYSTEM
Filed April 9, 1954   2 Sheets-Sheet 1

INVENTOR.
John R. Oishei and
BY   Henry C. Hueber
Bean, Brooks, Buckley & Bean
Attys.

Nov. 13, 1956 J. R. OISHEI ET AL 2,770,017
WINDSHIELD WASHER SYSTEM
Filed April 9, 1954 2 Sheets-Sheet 2

INVENTOR.
John R. Oishei and
BY Henry C. Hueber

Bean, Brooks, Buckley & Bean
attys.

United States Patent Office 2,770,017
Patented Nov. 13, 1956

2,770,017

WINDSHIELD WASHER SYSTEM

John R. Oishei, Buffalo, and Henry C. Hueber, Snyder, N. Y., assignors to Trico Products Corporation, Buffalo, N. Y.

Application April 9, 1954, Serial No. 422,066

7 Claims. (Cl. 20—40.5)

The purpose of this invention is to provide an arrangement for automatically replenishing the supply of liquid solvent to the reservoirs of windshield washers for subsequent use and application on a windshield in the path of its wiper for the removal of extraneous matter therefrom. Heretofore, in general use the windshield washers on motor vehicles have required replenishment of their liquid supply at more or less regular intervals to be certain of their functioning when needed. Otherwise, the motorist is inconvenienced by not having the service of his washer at a most opportune time and often when direly needed. In the instant disclosure, advantage is taken of the newer designs in automobile body building to utilize the trough or pipe line leading from the ventilating duct in the cowl as a means for recovering rainwater. Provision is made to T into the pipe line or trough a branch conduit for carrying water therefrom to the windshield washer reservoir.

The washer has become a vital part of the automotive equipment to insure the utmost safety in the handling of the vehicle. The water passages of the windshield washer are exceedingly small, therefore, it is important that the water of replenishment be clean. In certain sections of the country hard water is encountered which if used in the washer will deposit lime and other incrustation and thereby clog the small passages and impair if not defeat the purpose of the washer.

A further object of the invention is to provide for the automatic replenishment of the reservoir water with soft water to insure the greatest efficiency from the windshield cleaning system.

Another object of the invention is to provide means to insure against the over-filling of the washer reservoir and thus maintain in some balance the solutions used as antifreeze or for solvent detergent purposes.

A further object of the invention is to permit the relocating of windshield washer pump and reservoir units where such units may be more advantageously positioned optionally, within the car body, in contrast with the more common location of such instruments and reservoirs on the engine side of the firewall or under the bonnet covering the engine compartments.

Another object of the invention is to take advantage of the gutter or eave troughs of automobile bodies above the doors and side windows where rainwater may be more profusely available during the periods of time when the car is not in motion, or in combination with the ventilator trough located on the cowl.

A further object of the invention is to provide a washer system in which the rain collecting reservoir is built into the vehicle construction separate and distinct from the washer pump and thereby enable the pump to be compactly arranged in a convenient location on the vehicle.

Still another object of the invention is to provide a means of conserving the washer fluid, in particular such fluid as is mixed with solvent, means being provided to recondition the used fluid for reuse free of grit and other dirt.

By means of the filling conduit described it is readily possible to place the pump and reservoir of a windshield washer more closely to the delivery line used to carry fluids to the windshield jets, thus effecting economy in piping and otherwise benefiting the delivery of fluids through maintenance of more uniform pressure during the delivery cycle.

The foregoing and other objects will manifest themselves as this description progresses, wherein reference is made to the accompanying drawings in which—

Figure 1:
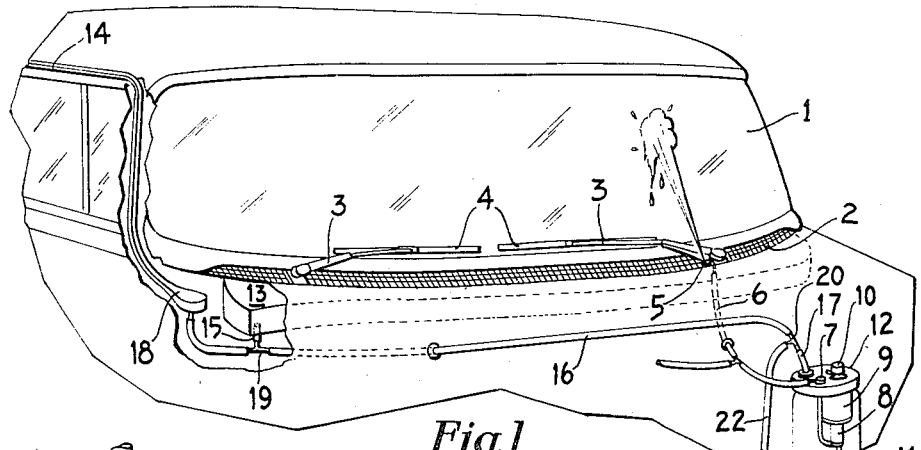
Fig. 1 is a fragmentary perspective view of the vehicle showing the present invention installed therein.

Referring more particularly to the drawing, the numeral 1 designates the windshield of a motor vehicle having a ventilating cowl opening 2 above which is journaled the wiper arms 3 carrying the wipers 4. The numeral 5 indicates one of the washer nozzles from which is ejected a spray of liquid solvent, such as water, onto the windshield within the path of the adjacent wiper, the nozzle being connected by a conduit 6 to the delivery pipe 7 of the pump 8. The pump is power actuated, as by suction motor 9, the pump motor being operatively connected to a source of suction, such as the intake manifold of the vehicle engine, through a control valve 10. The pump and its motor component are suspended in the reservoir 11 from its cover 12. This arrangement is generally similar to the washer now in use on motor vehicles on automobiles and it is more fully described in copending application Serial No. 323,902.

In accordance with the present invention, the water for replenishing the reservoir supply of solvent is rainwater which heretofore has been discarded and carried off by means of a trough or gutter within the cowl opening, such as is indicated at 13, and by means of gutters suitably arranged over the side windows or doors of motor vehicles, as indicated at 14. To this end, the collector 13 at the ventilating cowl opening may be provided with a drain passage 15 leading to a conduit 16 which latter empties through a downspout 17 into the rservoir 11. For increasing the replenishing supply of rain water the conduit 16 is extended, as at 18, upwardly to the roof gutter 14, the conduits 15, 16 and 18 being conveniently interconnected by a T connection 19, provision being made in the piping system for carrying excess water away from the reservoir as by means of an overflow fitting or connector 20 which has a lateral duct 21 to which the hose 22 may be connected for conveying the excess liquid down beneath the vehicle. At this point the overflow connector may be provided with a screen 23 inclined toward the lateral nipple 21 for screening out and diverting thereinto any of the larger particles of matter which may be in the collected rain water. Thus the larger particles are precluded from entering the reservoir at a point where the excess flow of liquid is diverted to the discharge tube 22. Access to the screen 22 may readily be gained by providing a removable cover 24 on the connector 20.

Figure 2:
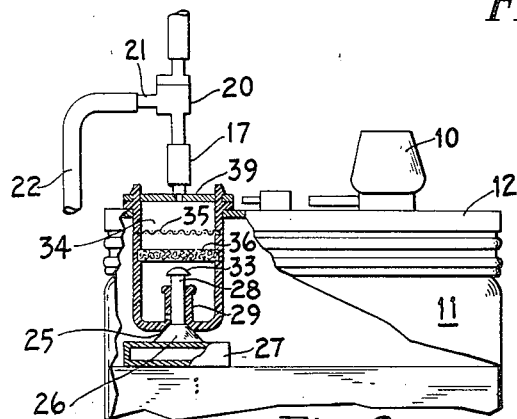
Fig. 2 is a fragmentary view, partly in section, of the self-filling reservoir.
Figure 4:
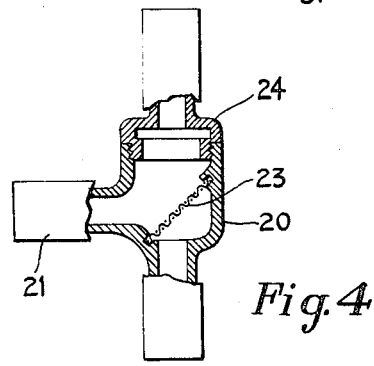
Fig. 4 is a detailed sectional view of the overflow connection.
Figure 5:
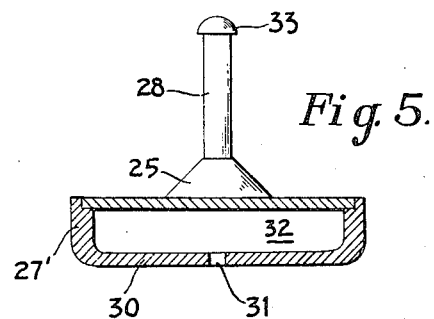
Fig. 5 is a detail view, partly in section, of a modified float valve.

The downspout 17 may open directly into the reservoir 11, but preferably there is provided a level determining valve through which the water is caused to pass, the same having a valve seat 25 upon which a valve 26 is designed to close under the buoyant effort of a float 27. As the liquid level rises with the reservoir compartment the float will lift the valve against its seat to close the entrance of further water thereinto. The valve has a guiding stem 28 slidably mounted within a perforated guide 29 which, when the valve is unseated, opens through the valve seat to discharge water into the reservoir or container. The float 27 may be of any suitable construction, such as the hermetically sealed body illustrated in Fig. 2, or as illustrated at Fig. 5 wherein the bottom wall 30 of the float 27' is provided with an aperture 31 to admit air into the chamber 32. Any liquid which enters this chamber will drain out when the water level falls below the float valve. A stop shoulder 33 on the valve stem 28 will engage the guide sleeve 29 to suspend the float valve when the water level lowers a predetermined distance.

To remove the smaller particles of foreign matter from the replenishing liquid there is arranged in the downspout 17, or immediately therebelow, a filter chamber 34 which may be a part of the float chamber unit. Within the filter chamber is arranged a finer screen element 35 and/or a filter pad 36. This valve unit with its filter chamber is shown as being mounted within an opening through the cover 12 to suspend the float controlled valve therefrom.

In operation, whenever it rains the water will be collected by either trough or channel 13, 14, or both, and delivered by the hose 16 to the reservoir chamber, the impurities in the water being screened or filtered out so that the inflowing water will be practically clean. In addition to this purifying action, the inlet tube 37 of the pump unit is usually provided with a screen so that when the water is finally discharged through the small passage of each jet 5, there being one for each wiper, it will be free of passage clogging matter. The inlet and outlet valves of the pump, as set forth in the above referred to application, will cause uni-directional flow of the liquid solvent through the pump to the spray applying jets. When the reservoir is filled to a predetermined level, the float valve will close off the flow of liquid to the reservoir and compel the excess liquid to discharge laterally through the duct 21 and conduit 22 to a point beneath the car.

The arrangement provides a practical means for automatically replenishing the windshield washer. The motorist will thereby be assured, under normal conditions, of the proper functioning of the washer when its use is desired. Under abnormal conditions, such as during a drought, a replenishment can be effected readily through a water hose at a service station. The controlled filling of the reservoir protects the pump motor and prevents the flooding of the engine compartment with excess liquid, and, further, the float valve conserves any anti-freeze or detergent in solution.

Figure 3:
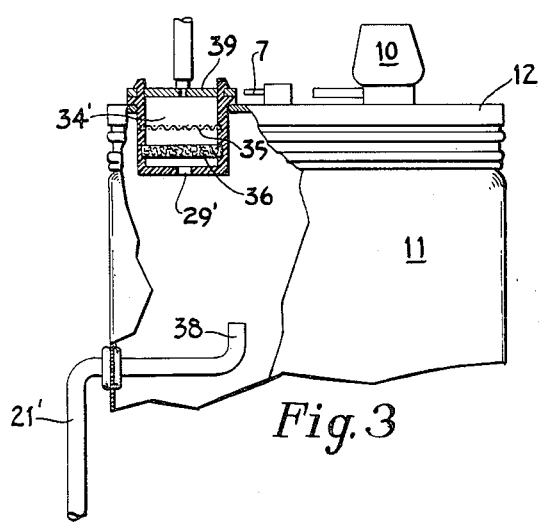
Fig. 3 is a similar view of a modified reservoir.

In lieu of this controlled replenishment of the reservoir, the float controlled valve may be dispensed with and an overflow vent in the form of a duct 21', Fig. 3, take its place, the duct opening directly into the reservoir for carrying off the excess liquid to maintain the desired maximum level. The inner end 38 of the duct may be turned upwardly, as illustrated, or it may be turned downwardly. The filter chamber 34, (34') may be closed by a removable cover 39. Preferably, end 38 is displaced from a position immediately beneath the inlet opening 29'.

Figure 6:
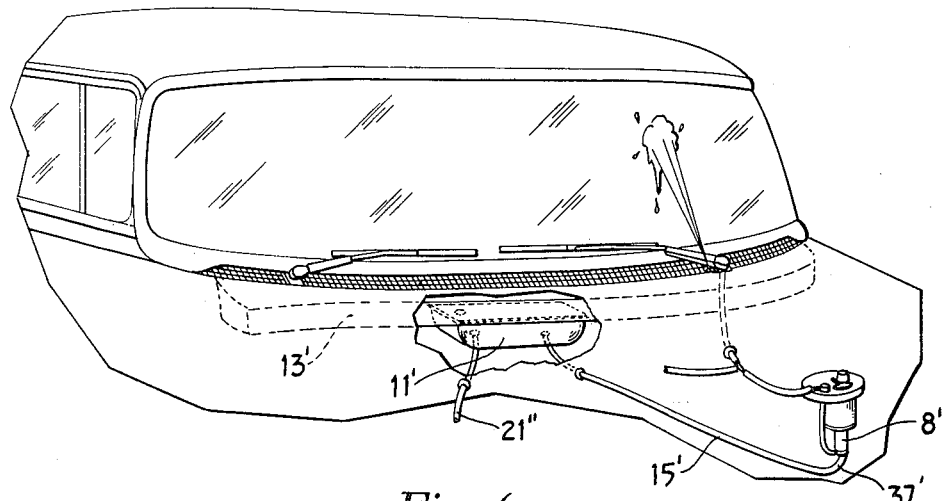
Fig. 6 is a view similar to Fig. 1 but showing a built-in reservoir arrangement.
Figure 7:
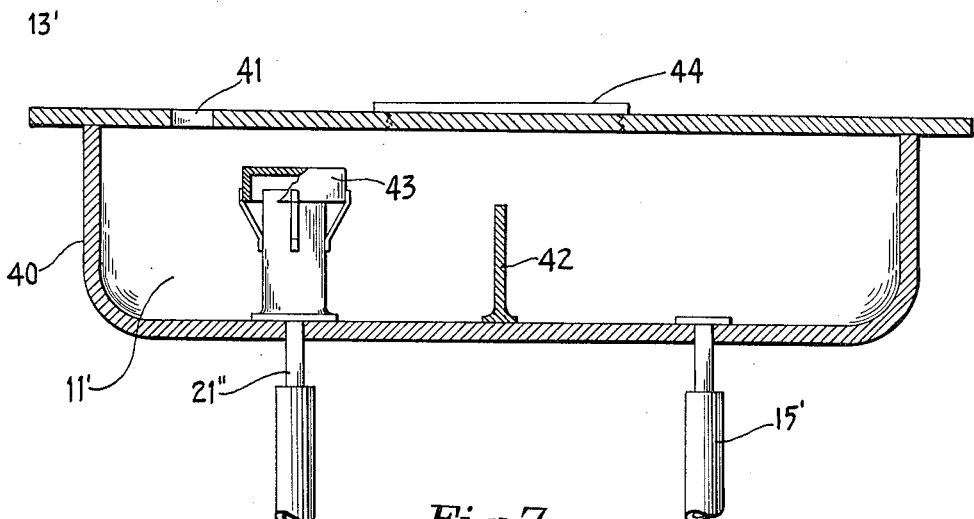
Fig. 7 is an enlarged detail sectional view through the built-in reservoir.

Having once been installed, the washer unit may be refilled simply by pouring the liquid solvent into a connected trough. Therefore, the reservoir may be located in a concealed position. Or, it may be built into the structure of the vehicle body, such as is shown in Figs. 6 and 7 wherein the reservoir in the form of a cupped plate 40 is attached by spot welding or otherwise to the underside of the ventilating trough 13', the latter having an opening 41 for emptying the rain water into the reservoir chamber 11' thus provided. A conduit 15' connects the reservoir chamber to the inlet 37' of the pump 8', and any excess liquid which may enter the reservoir chamber 11' will be carried off by a drain conduit 21'' to maintain a maximum liquid content in the reservoir. To avoid the liquid content from splashing about in the reservoir there is provided one or more splash plates 42, and further to minimize the splash wasting of the liquid content, the inner end of the drain duct 21'' may be provided with a loose fitting cap 43. This arrangement enables the use of a more compact pump unit for convenient placement in the otherwise crowded accessory quarters of a modern automobile. A closure plug 44 may be threaded with a clean-out opening to gain access to the reservoir for cleaning the same.

The invention is practical in that it provides for the automatic replenishment of the washer system. It insures a supply of soft water for better results by collecting the rain from the exterior surface of the vehicle, and it also accomplishes the replenishment in a manner to conserve any ingredient which may have been previously added to the water.

While the foregoing description has been given in detail for clarity it is without thought of limitation since the inventive principles involved are capable of assuming other physical embodiments without departing from the spirit of the invention and the scope of the appended claims.

What is claimed is:

1. A motor vehicle having a windshield and a water collecting channel for receiving rain water from the exterior surface of the vehicle; a windshield washer having a liquid containing reservoir, a spray nozzle adjacent the windshield, and liquid displacing means operably connected to displace liquid from the reservoir through the nozzle onto the windshield; and water passage means connecting the channel to the reservoir for replenishing its liquid content and including level-determining means for the reservoir operable to divert the excess rain water from entering the reservoir whereby to preclude the dilution of its liquid content.

2. A motor vehicle having a windshield and a water trough positioned for collecting surface rain water and diverting it away from entering the passenger compartment of the vehicle; a windshield washer having a liquid reservoir, a spray nozzle adjacent the windshield, and liquid displacing means operable to displace liquid from the reservoir through the nozzle onto the windshield; and a conduit connecting the channel to the reservoir to replenish its supply of liquid solvent and having an overflow passage upstream from the reservoir, and a float-controlled valve responsive to the liquid level in the reservoir and operable to divert excess rain water out the overflow passage prior to entering the reservoir.

3. A motor vehicle having a windshield and a water collecting channel for diverting surface rain from the interior of the vehicle; a windshield washer having a liquid holding reservoir, a spray applying nozzle adjacent the windshield, and liquid displacing means operable to displace liquid from the reservoir through the nozzle onto the windshield; and water conveying means connecting the channel to the reservoir for replenishing its liquid content by rain water, said liquid conveying means embodying a float-controlled valve responsive to the liquid level in the reservoir for limiting the replenishment, a waste vent for discharging excess rain water exteriorly of the reservoir, and self-cleaning screening means arranged in the conveying means to discharge foreign matter into the vent.

4. A windshield washer having a reservoir, a pump having an inlet from the reservoir and an outlet for delivering liquid solvent onto an associated windshield, a replenishing conduit disposed for collecting rain water and discharging into the reservoir, and a float controlled valve responsive to a predetermined liquid level within the reservoir to divert excess liquid therefrom, said conduit having an overflow passage.

5. A windshield washer having a reservoir, a pump having an inlet from the reservoir and an outlet for delivering liquid solvent onto an associated windshield, a replenishing conduit discharging into the reservoir, and a float controlled valve responsive to a predetermined liquid level within the reservoir to divert excess liquid therefrom, said conduit having an overflow passage, and a self-cleaning screen positioned in the conduit adjacent the overflow passage to be washed by the excess liquid flowing out through the passage.

6. A motor vehicle having a windshield, a rain water collecting trough for diverting surface rain from the passenger compartment of the vehicle, a reservoir into which the trough empties, and means for applying the liquid content of the reservoir to the windshield.

7. A motor vehicle having a windshield with a cowl ventilator and rain collecting trough in the ventilator and about the roof of the vehicle for collecting rain water against entering the interior of the vehicle, means for connecting the roof trough to the ventilator trough, a reservoir into which the troughs jointly empty, a spray nozzle arranged adjacent the windshield to direct water thereon, liquid displacing means operably connected to displace water from the reservoir through the nozzle, and means for controlling the replenishment of the reservoir by the rain troughs to prevent flooding said reservoir.

References Cited in the file of this patent

UNITED STATES PATENTS

| | | |
|---|---|---|
| 2,594,437 | Horton | Apr. 29, 1952 |
| 2,673,762 | Doyle | Mar. 30, 1954 |

FOREIGN PATENTS

| | | |
|---|---|---|
| 723,750 | France | January 1932 |